Patented Oct. 12, 1926.

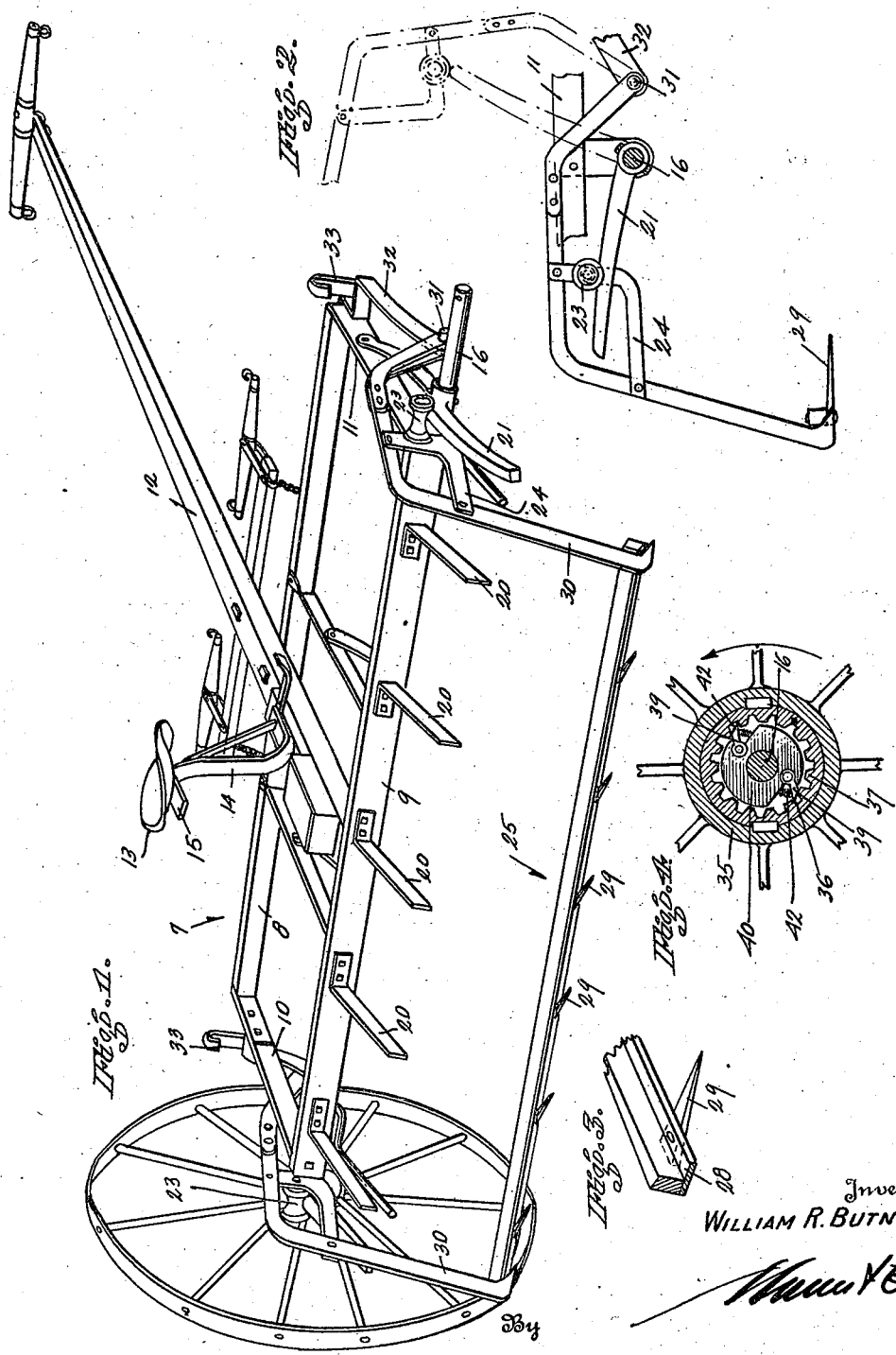

1,603,190

UNITED STATES PATENT OFFICE.

WILLIAM R. BUTNER, OF YERINGTON, NEVADA.

HAY BUNCHER.

Application filed November 30, 1925. Serial No. 72,376.

This invention relates to agricultural implements, and more particularly it relates to a hay buncher.

An object of my invention is the provision of an automatic hay buncher.

Another object of my invention is the provision of a hay buncher capable of picking hay from the ground, lifting it and throwing it back on the ground in reversed or inverted position so that it may be cured more quickly and uniformly.

A further object of my invention is the provision of a very light hay buncher.

A still further object of my invention is the provision of a labor saving hay buncher, and one that is simple in construction and operation.

With the foregoing objects in view, together with such other objects as may subsequently appear, this invention resides in the construction and arrangement of parts hereinafter described and claimed, and illustrated in the accompanying drawings, in which—

Figure 1 is a perspective view of my improved hay buncher, one wheel being removed.

Figure 2 is a side elevation of part of my device.

Figure 3 is a perspective fragmentary view of the rake employed in my device, and Figure 4 is a vertical sectional view of the hub of the wheels and associated apparatus of my device.

Referring to the drawings for more detailed description thereof, my hay buncher comprises a rectangular frame 7 having a front member 8, rear member 9 and side members 10 and 11. The numeral 12 indicates the tongue, and the numeral 13 indicates the seat mounted on a support 14 having a horizontal portion 15 extending rearwardly of the seat. The device also comprises an axle 16 rotatably mounted on the machine and on which the wheels are mounted. Prongs 20 for cleaning a rake are secured to the rear member 9 of the frame and project backwardly therefrom in parallel relation to each other. Arms 21 are fixedly mounted on the shaft 16 beyond the sides of the frame. These arms 21 are preferably convex on their upper surfaces and are adapted when turned by the turning of the axle to each engage a spool 23 mounted each on a member 24 and extending outwardly therefrom. The members 24 form part of a rake structure 25 so that when the arms 21 are turned, their engagement with the spools 23 lifts the rake. The rake comprises an angle bar 28 to which are secured prongs 29. To the ends of the bar 28 are secured members 30 pivoted at 31 to members 32 secured at their ends to the frame member 8. Bumpers 33 are secured to the members 32.

Each of the wheels comprises a hub 35 within which is fitted a circular member 36 on which is formed an internal gear comprising teeth 37 adapted to be engaged by pawls or dogs 39 pivotally mounted on a plate 40 fixedly mounted on the shaft 16. Coiled spring members 42 are secured to the dogs or pawls 39 and to the plate 40. When the wheels turn in the direction shown in Figure 4, the dogs engage the teeth of the internal gear so that the shaft 16 is turned. The turning of the shaft 16 turns upwardly the arms 21 which lift the rake. The rake with hay or other material thereon carries the latter with it as it rises, and, when in a certain position, throws the hay or other gathered material back onto the ground in inverted or reversed position to that which it had before it was gathered by the rake.

The rake is thrown backward on the arms 21 until it assumes a position shown in dash-dot lines in Figure 2, in which position the arms 21 pass under the spools 23, as also shown in Figure 2. The rake in its most forward position strikes the bumpers 33 and by them is thrown backwardly onto the ground ready to pick up another windrow. The throwing back of the rake is due to the reaction resulting from the impact of the rake structure on the bumpers 33. It will be readily understood that the rollers 23 may be made adjustable, if desired, by providing elongated slots in the members 24.

Although I have shown and described one embodiment of my invention, it is to be understood that the same is susceptible of various changes; and I reserve the right to employ such as may come within the scope of the appended claims.

I claim:—

1. In a hay buncher, a frame, rake structure pivoted to said frame, an axle rotatably mounted on said frame, wheels freely mounted on said axle, circular ratchets turnable with said wheels, plates secured to said axle, pawls pivoted to said plates and engaging said ratchets, and arms secured to said axle and adapted to contact with said rake structure during part of every revolution to raise said rake structure.

2. In a hay buncher, a frame, rake structure pivoted to said frame, an axle rotatably mounted on said frame, wheels freely mounted on said axle, circular ratchets turnable with said wheels, plates secured to said axle, pawls pivoted to said plates and engaging said ratchets, and arms secured to said axle and adapted to contact with said rake structure during part of every revolution to raise said rake structure, and bumpers for throwing the rake structure back to the ground after it has been lifted.

3. In a hay buncher, a frame, rake structure pivoted to said frame, an axle rotatably mounted on said frame, wheels freely mounted on said axle, circular ratchets turnable with said wheels, plates secured to said axle, pawls pivoted to said plates and engaging said ratchets, arms secured to said axle and adapted to lift said rake, and spools extending from said rake structure adapted to be engaged by said arms whereby said rake may be lifted.

4. In a hay buncher, a frame, rake structure pivoted to said frame, an axle rotatably mounted on said frame, wheels freely mounted on said axle, circular ratchets, turnable with said wheels, plates secured to said axle, pawls pivoted to said plates and engaging said ratchets, arms secured to said axle and adapted to lift said rake, spools extending from said rake structure adapted to be engaged by said arms whereby said rake may be lifted, and bumpers for throwing the rake back to the ground after it has been lifted.

WILLIAM R. BUTNER.